United States Patent
Aumann et al.

(10) Patent No.: US 9,446,902 B2
(45) Date of Patent: Sep. 20, 2016

(54) CONVEYING DEVICE FOR CONVEYING PRODUCTS

(71) Applicant: Uhlmann Pac-Systeme GmbH & Co. KG, Laupheim (DE)

(72) Inventors: Thomas Aumann, Mietingen (DE); Juergen Haaga, Rottenacker (DE); Wolfgang Rodi, Laupheim/Baustetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 14/947,901

(22) Filed: Nov. 20, 2015

(65) Prior Publication Data

US 2016/0152414 A1 Jun. 2, 2016

(30) Foreign Application Priority Data

Dec. 1, 2014 (EP) ..................................... 14195638

(51) Int. Cl.
*B65G 23/18* (2006.01)
*B60L 13/03* (2006.01)
*B65G 17/32* (2006.01)
*B65G 17/00* (2006.01)

(52) U.S. Cl.
CPC ............. *B65G 17/32* (2013.01); *B65G 17/002* (2013.01)

(58) Field of Classification Search
CPC ....... B65G 54/02; B65G 23/23; B60L 13/03; B60L 13/04; B60L 13/06
USPC ..................... 198/805, 867.01; 104/290, 293
See application file for complete search history.

(56) References Cited

U.S. PATENT DOCUMENTS

| 4,817,533 | A | * | 4/1989 | Azukizawa | ............ | B65G 54/02 |
| | | | | | | 104/129 |
| 2004/0256918 | A1 | | 12/2004 | Beakley | | |
| 2013/0270072 | A1 | * | 10/2013 | Mihai | .................... | B65G 23/18 |
| | | | | | | 198/805 |
| 2014/0054138 | A1 | | 2/2014 | van de Loecht | | |
| 2015/0027338 | A1 | | 1/2015 | Aumann et al. | | |
| 2015/0041288 | A1 | | 2/2015 | Van de Loecht et al. | | |
| 2015/0274433 | A1 | * | 10/2015 | Hanisch | ................. | B65G 54/02 |
| | | | | | | 198/805 |

FOREIGN PATENT DOCUMENTS

| DE | 4301434 A1 | 7/1994 |
| DE | 102011017525 | 10/2012 |
| DE | 102012200951 A1 | 7/2013 |
| DE | 102012103378 A1 | 10/2013 |
| EP | 2460446 A1 | 6/2012 |
| WO | WO 2009/039865 A1 | 4/2009 |
| WO | WO 2010/083979 A1 | 7/2010 |

OTHER PUBLICATIONS

European Search Report for EP 14195638 dated May 15, 2015.

* cited by examiner

*Primary Examiner* — James R Bidwell
(74) *Attorney, Agent, or Firm* — Brinks Gilson & Lione (57) ABSTRACT

The conveying device for conveying products comprises a plurality of slides individually movable with respect to each other to hold the products and a guide rail, on which the slides are guided. A linear motor drive unit serves to drive the slides, wherein each of the slides comprises permanent magnets, which interact with the coils of the linear motor drive unit. Each slide comprises a horseshoe-shaped or U-shaped base carrier with two legs, which enclose the guide rail from opposite sides. The base carrier is divided into at least two interconnected subsections, each of which comprises a leg. The subsections are movable relative to each other, as a result of which the gap width between the legs can be adjusted.

13 Claims, 13 Drawing Sheets

CONVEYING DEVICE FOR CONVEYING PRODUCTS

RELATED APPLICATIONS

The present patent document claims the benefit of and priority to European Patent Application No. EP 14195638.3, filed Dec. 1, 2014, the entire contents of which are incorporated herein by reference.

FIELD AND BACKGROUND

The present disclosure relates to a conveying device for conveying products.

Among the uses of linear motor technology are transport systems comprising conveying elements or slides, which are movable individually with respect to each other. The slides, also called "movers", are guided along a guide rail. The guide rail is usually configured as a stationary system in the form of an endless loop. The slides are driven in a transport direction by a linear drive. The linear drive comprises several coils, which, when electrically energized, build up an alternating magnetic field. Magnets, in particular permanent magnets, are mounted on the slides or movers so that the movers can be driven. Because each coil can be supplied with current individually, each slide can be driven individually.

A transport device of this type is disclosed in, for example, DE 10 2012 103 378 A1. The slide comprises substantially the shape of an inverted U with two legs, wherein the two legs are connected rigidly to each other. Permanent magnets, which interact with the coils of the linear drive unit, are arranged at the ends of the legs. Because the individual slides enclose the guide rail, it is difficult and time-consuming to remove a slide from the closed rail system for cleaning or replacement, for example.

In DE 10 2012 200 951 A1, the transport device also comprises several slides, which are guided on a stationary guide rail configured as an endless loop. The slides also comprise subsections, which are connected to each other by an articulated joint. This joint makes it possible to keep the distance between the permanent magnets and motor coils nearly constant in the curved areas.

A transport system with a change-out or lock device for replacing slides is described in, for example, DE 10 2011 017 525 A1. The transport system here comprises a closed transport route, along which the slides are guided. So that wear parts can be replaced, for example, or so that the slides can be cleaned, the transport system comprises a lock device, by means of which the transport route can be opened or closed, allowing the slides to be removed when the lock is opened.

SUMMARY

The present disclosure provides a conveying device for conveying products in which a slide can be removed or installed at any desired point along the guide rail and in which this can be done in an especially easy and rapid manner.

According to an aspect of the present disclosure, the conveying device for conveying products comprises one or a plurality of slides, which are movable individually with respect to each other, for holding the products and a guide rail, preferably configured as an endless loop, on which the slides are guided. The conveying device also comprises a linear motor drive unit for driving the slides, wherein each of the slides comprises at least one permanent magnet, which interacts with the linear motor drive unit. Each slide comprises a substantially horseshoe-shaped or U-shaped base carrier with two legs, which enclose the guide rail on two opposite sides. The base carrier is divided into at least two interconnected subsections, each of which comprises one leg. The at least two subsections are movable relative to each other. The subsections are movable between a closed working position, in which the base carrier encloses the guide rail, and an open maintenance position, in which the base carrier can be removed from the guide rail.

With this configuration, it becomes possible to remove the slides from the guide rail quickly and to reinstall the slides back on the guide rail at any point along the rail.

The two subsections are preferably movable relative to each other transversely to the longitudinal direction of the guide rail. In this way, it becomes especially easy to change the width of the gap between the legs and to remove the slide quickly from the guide rail.

It is especially advantageous for the two legs to have mirror-image symmetry with respect to the longitudinal center plane of each slide. With this configuration, the weight of the slide can be distributed uniformly, which in turn allows the slide to run smoothly along the rail.

The subsections are preferably connected to each other in such a way that they can pivot relative to each other around a pivot axis parallel to the longitudinal direction of the guide rail. The pivot axis is preferably arranged in the area of the longitudinal center plane of the slide. This creates a geometry optimal for the removal of the slide.

The pivot axis is preferably configured as a positive articulated connection. The positive articulated connection can be realized by, for example, a dowel pin, which engages in through-holes passing through the subsections.

In another form of the conveying device, each of the two subsections comprises recesses and projections in the area of the pivot axis, wherein the recesses and projections are arranged in such a way that the projections of the one subsection engage in the recesses of the other subsection, and the through-holes in the projections are aligned with the recesses. This ensures a stable pivot axis over the entire length of the base carrier.

The coils of the linear motor drive unit also preferably comprise stators with stator teeth, and the attractive force between the permanent magnets and the stator teeth opposes an undesirable increase in the width of the gap between the legs. In this way, it is possible to make the slide quite rigid without the need for additional measures, and the desired smooth-running behavior is achieved simultaneously. In addition, the rollers are pretensioned and are free of play even after the diameter of the roller has decreased as a result of wear. This is advantageous in terms of the reliable control of the movement of the slide. Most of the pretensioning force is generated by the interaction between the permanent magnets and the ferrous stator teeth. This force can be increased by sending current through the coils. Thus the pretension of the rollers can also be changed on the basis of the current in the coils.

So that the two-part slide can be made even more rigid to meet the demands of certain heavy transport applications, the slide can comprise a removable add-on element, which is connected either positively or frictionally to the two subsections of the base carrier and which opposes an undesirable increase in the width of the gap between the legs.

The add-on element can comprise two arms, which hold the two subsections of the base carrier positively between them. In an especially preferred embodiment, the add-on element can comprise substantially the shape of an inverted U.

Alternatively, the add-on element can be a dowel pin, which extends through both subsections of the base carrier substantially transversely to the longitudinal direction of the guide rail. Thus, in a simple manner, the two subsections are prevented from swinging open undesirably.

Finally, it is preferable for the subsections to comprise openings in the area near the pivot axis to hold the pins of an opening tool. In this way, the base carrier can be pivoted into the open maintenance position by means of a simple mechanical aid.

BRIEF DESCRIPTION OF THE DRAWINGS

Additional properties and advantages of the present invention can be derived from the following description, which refers to the drawings.

DETAILED DESCRIPTION OF SPECIFIC EMBODIMENTS

Figure 1:
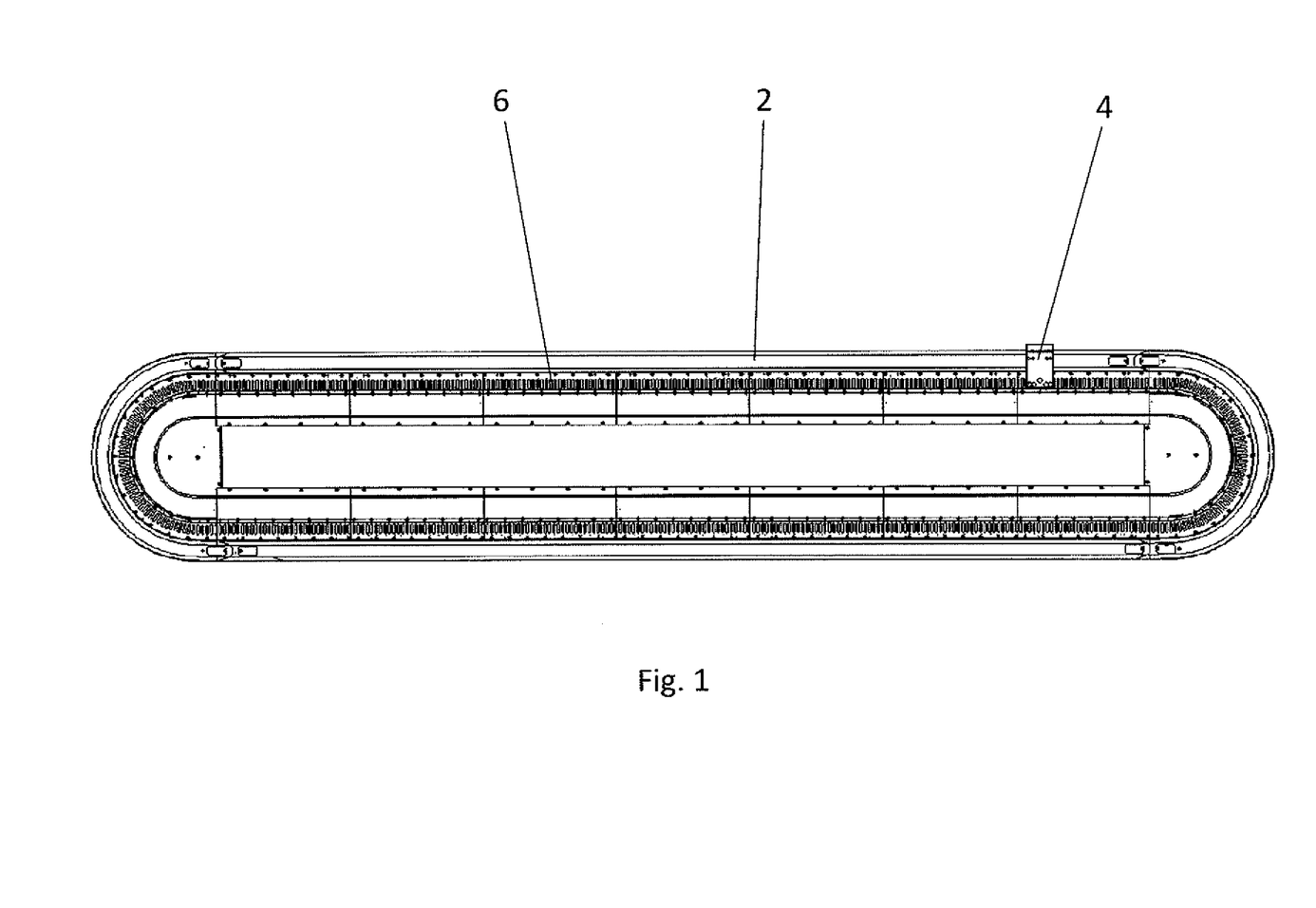
FIG. 1 shows a schematic diagram, from the side, of one exemplary embodiment of a conveying device according to the invention with an endless guide rail and a slide, which is supported on the rail and can be moved along it.

FIG. 1 shows one possibility for the basic structure of a conveying device according to the present disclosure for conveying products. The conveying device comprises a preferably stationary, endless guide rail 2 for guiding at least one movable slide 4, which serves to convey one or more products and which is moved along the guide rail 2. Although only one slide 4 is present in the exemplary embodiment shown here, usually several slides 4 will be traveling simultaneously along the same guide rail 2. The material of the guide rail 2 and of the slide 4 is preferably aluminum.

Figure 2:
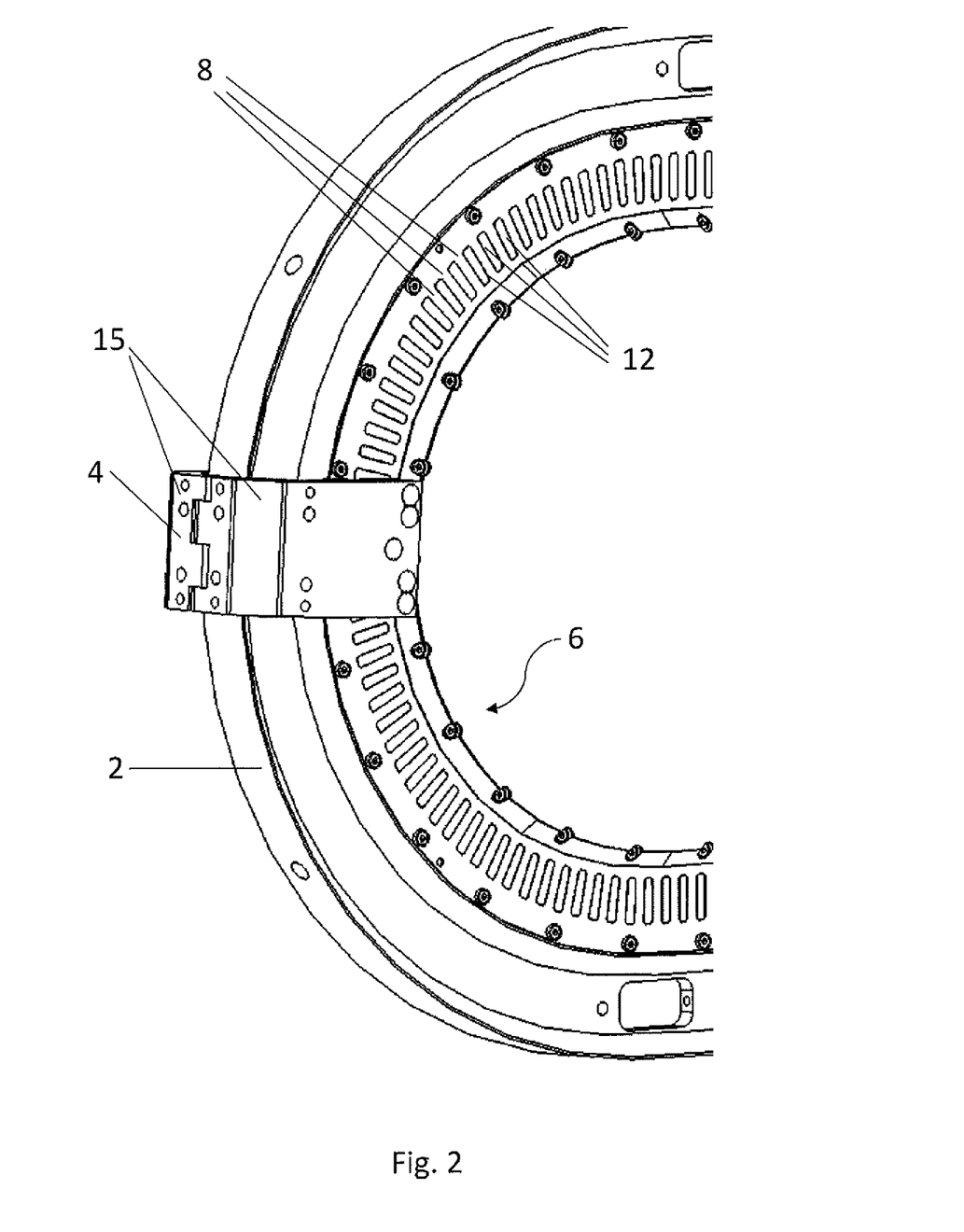
FIG. 2 shows an enlarged perspective view of a curved section of the conveying device of FIG. 1.
Figure 3:
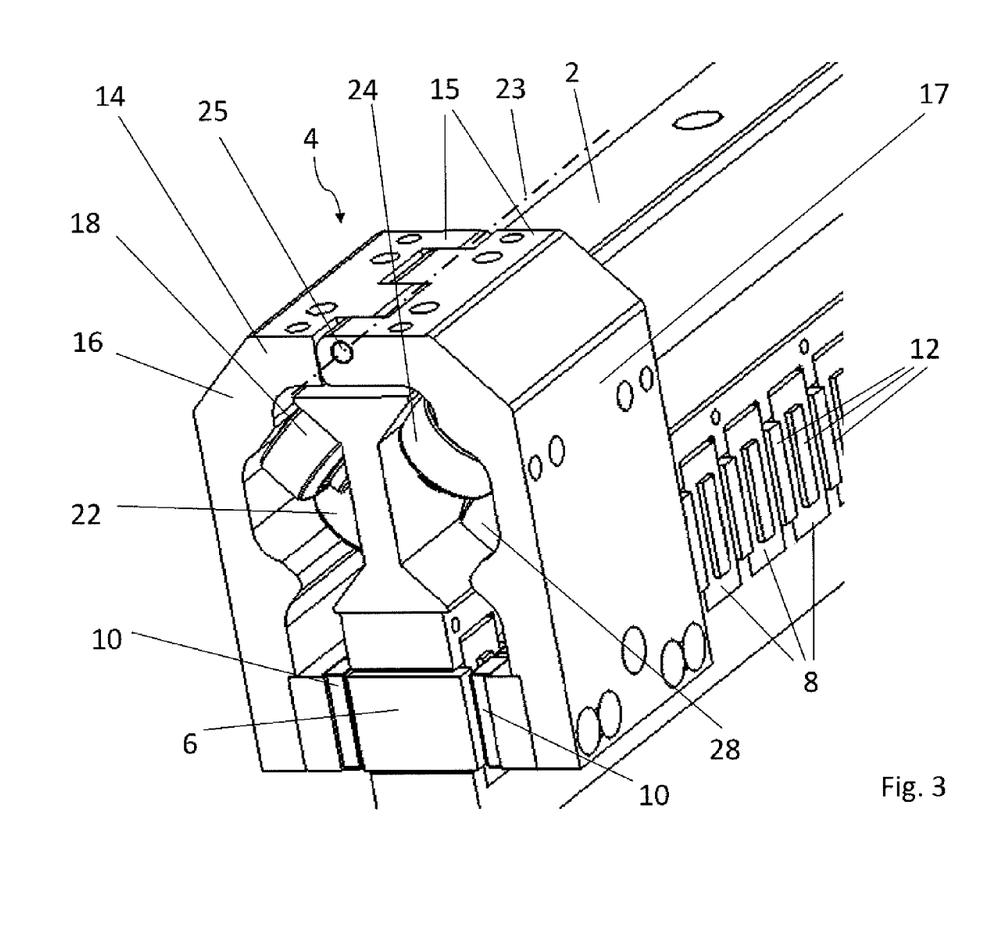
FIG. 3 shows a perspective schematic diagram of a straight section of the conveying device of FIG. 1.
Figure 4:
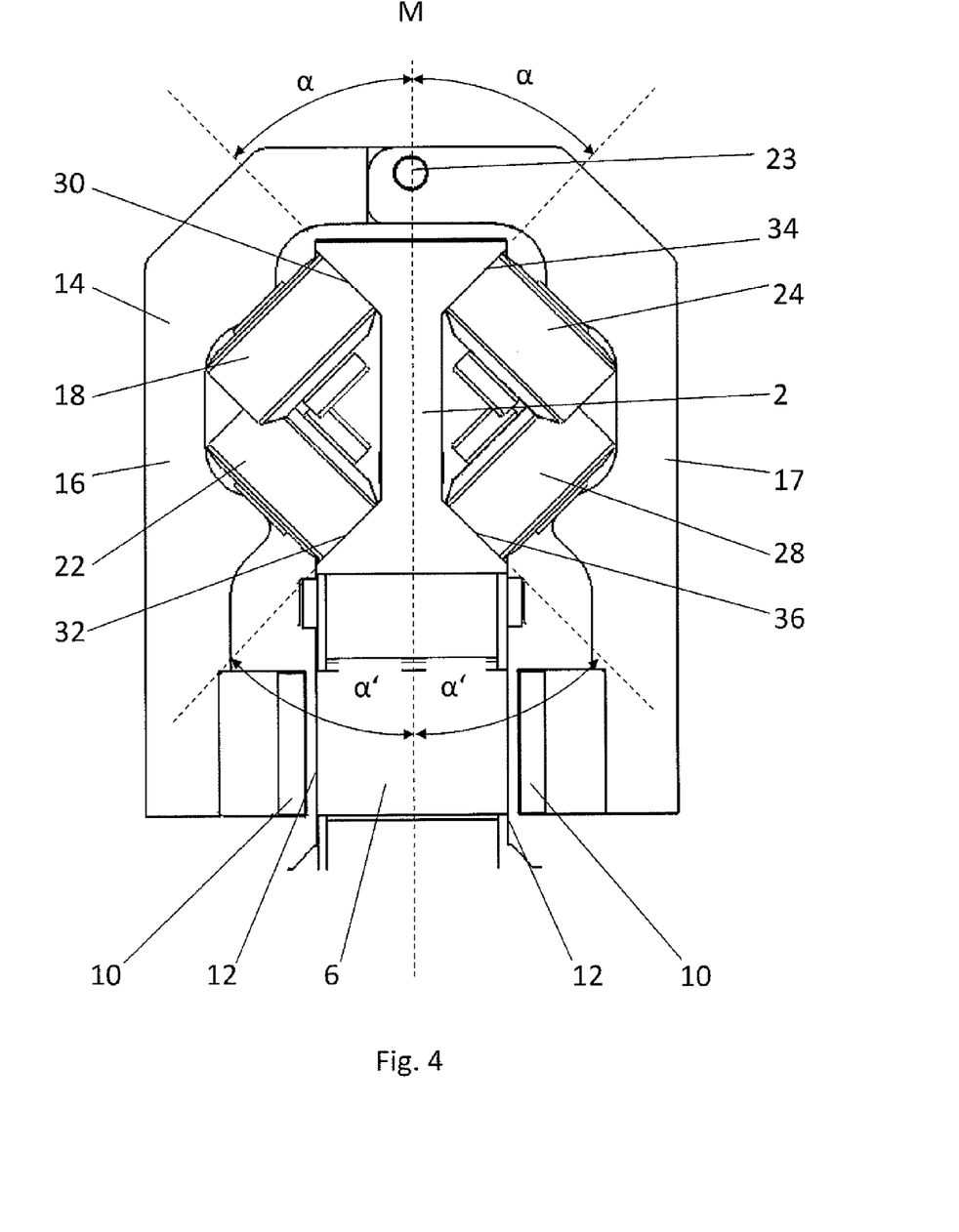
FIG. 4 shows a cross-section of the slide of FIG. 1 supported on the guide rail.
Figure 5:
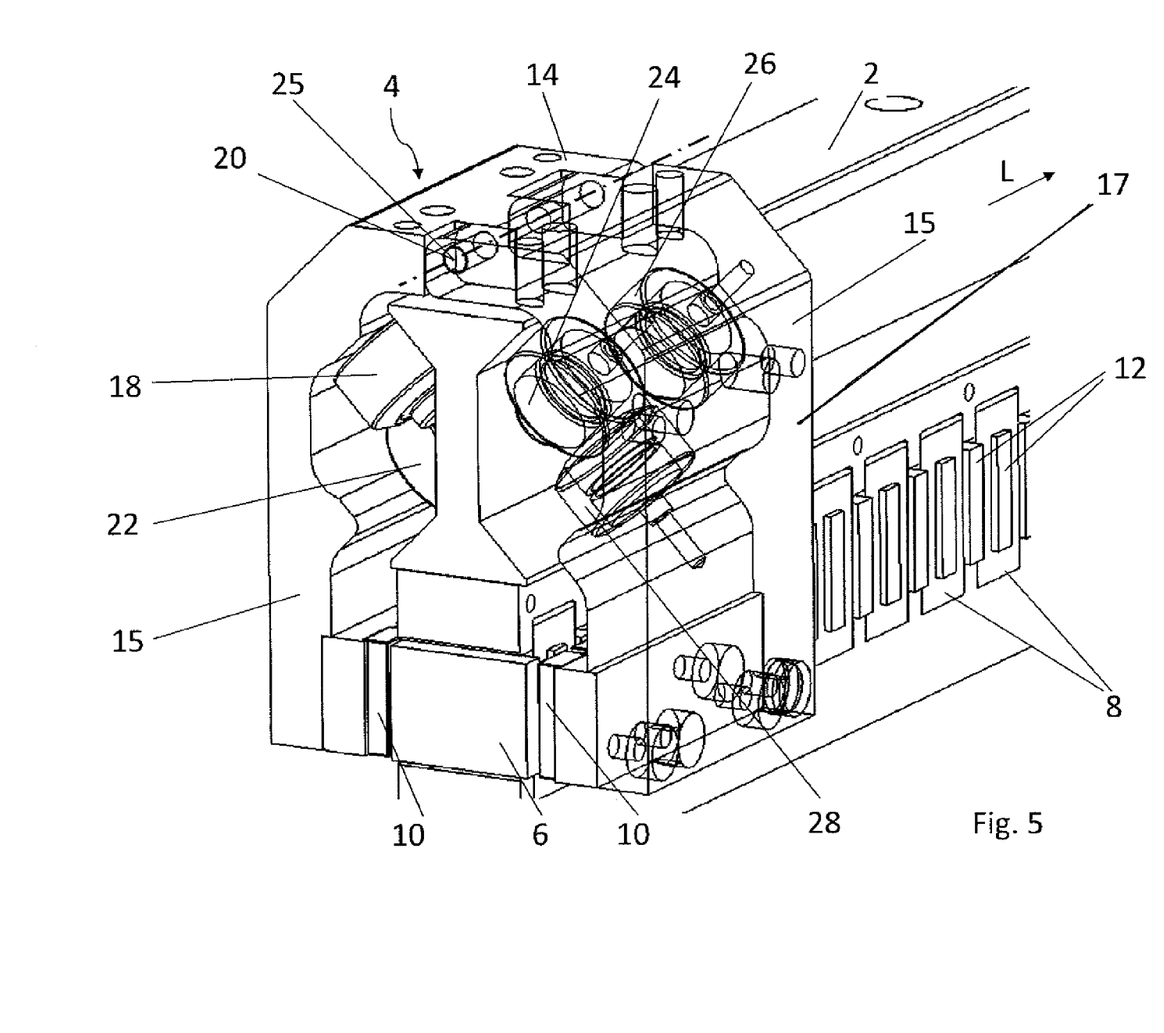
FIG. 5 shows a perspective view of the slide of FIG. 4 with base carrier, illustrated as if it were transparent.

To drive the at least one slide 4, a linear motor drive unit 6 is used, which is usually configured as a motor coil package. The linear motor drive unit 6 comprises many coils 8 arranged in a row (see FIG. 2), preferably made of copper, each of which can be energized individually. The slide 4 in turn comprises, as can be seen in FIGS. 3 and 4, for example, at least one, preferably two, permanent magnets 10, which interact with the linear motor drive unit 6. The slide 4 is supported by and guided along the guide rail 2 by a plurality of rollers, which will be discussed in greater detail further below. These rollers are preferably made of plastic.

Figure 7:
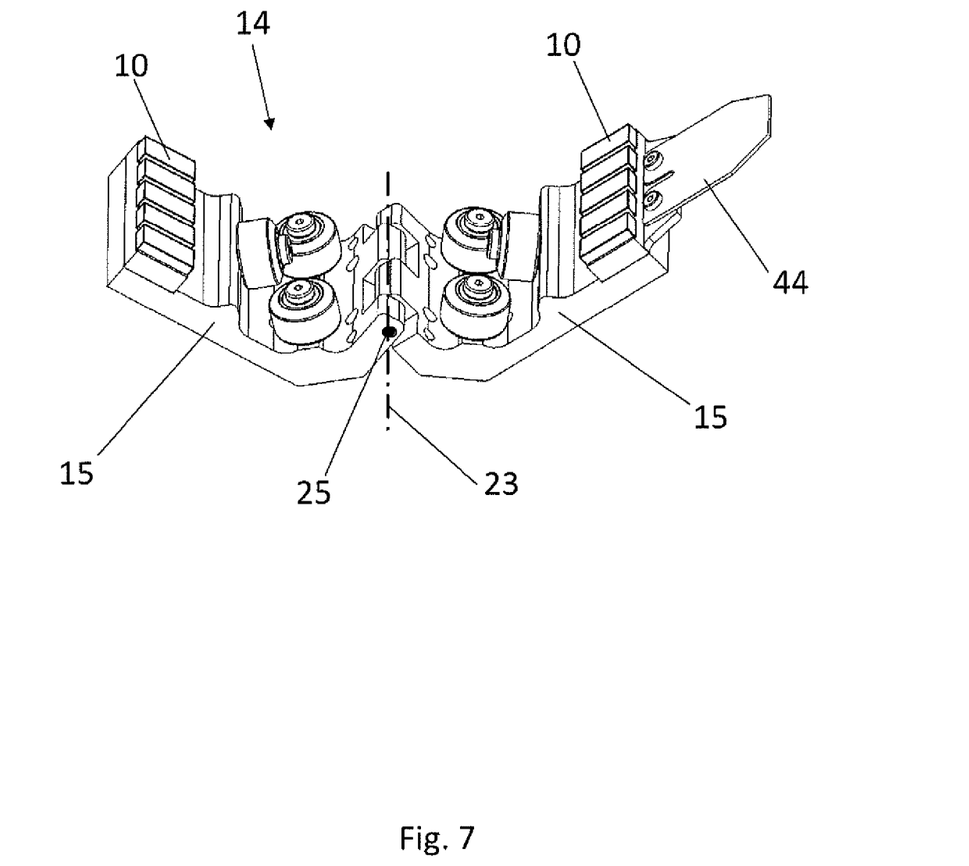
FIG. 7 shows a perspective view of a slide in the swung-open position.
Figure 8:
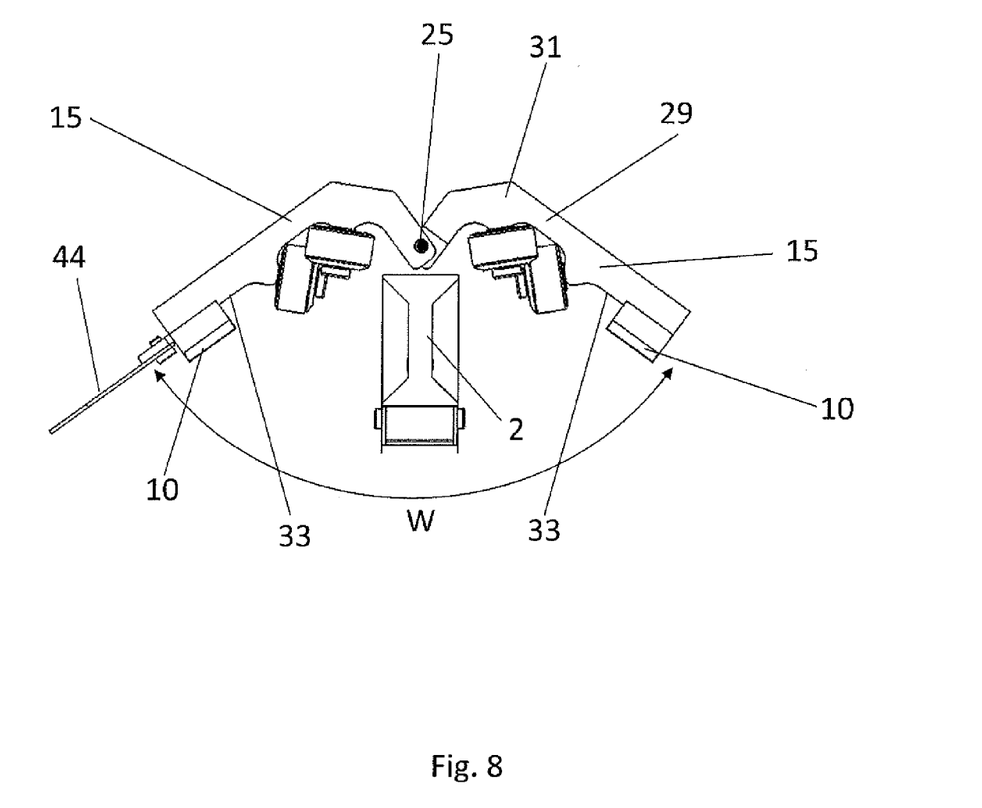
FIG. 8 shows a front view of the opened slide of FIG. 7.
Figure 9:
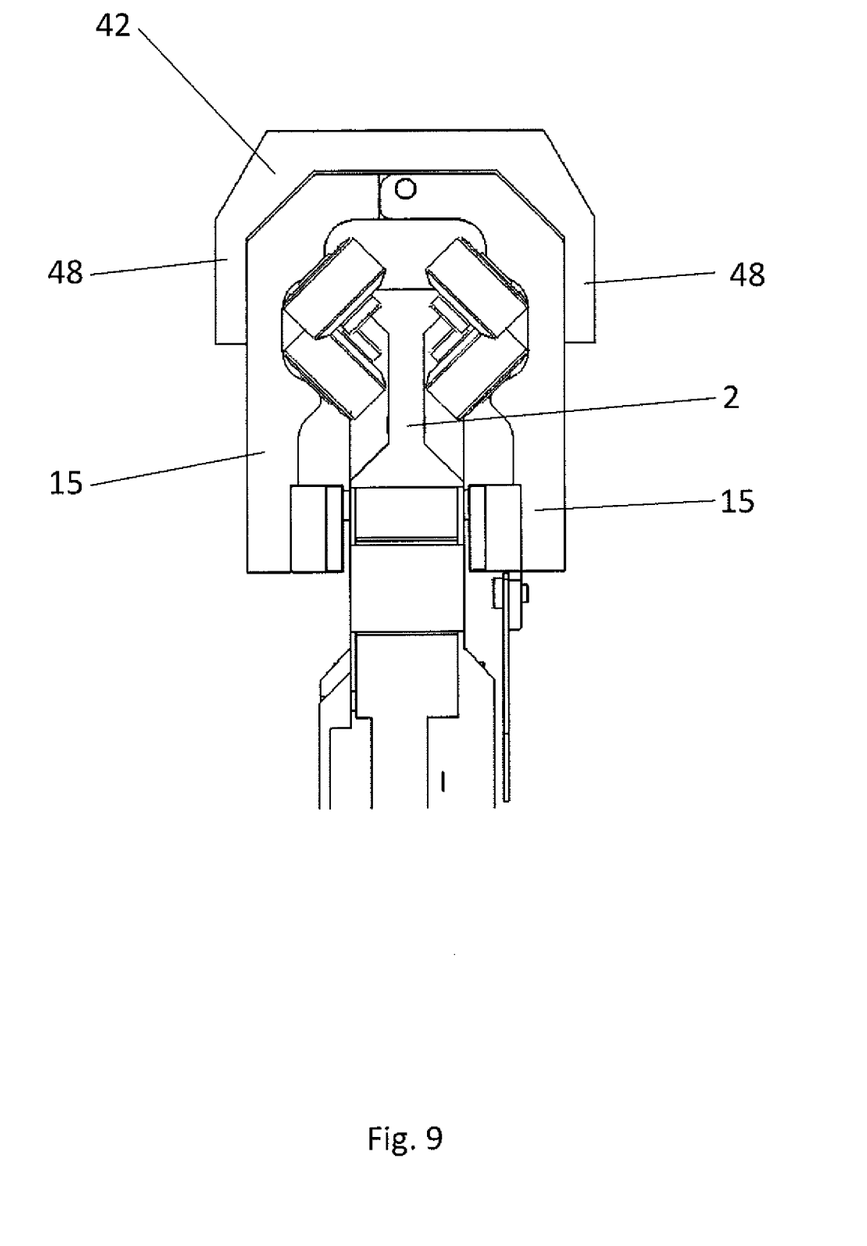
FIG. 9 shows a front view of the slide of FIG. 8 in the closed position with one embodiment of an add-on element.

When current is sent through the coil 8, local magnetic fields are created, and thus a force flows between the coil 8 and the permanent magnets 10. Through intelligent actuation and energizing of the individual coils 8, a "traveling" magnetic field can be generated, which can move each of the individual slides 4 independently of the other slides 4. Because the permanent magnets 10 are arranged at the sides of the linear motor drive unit 6, the force acting directly between each coil 8 and the permanent magnets 10 is theoretically neutralized, and what remains is only a drive force, which acts on the slide 4. As shown in FIGS. 7-9, a sensor flag 44 can be arranged on the slide so that the route being traveled can be tracked and the position of the slide 4 can be transmitted to the linear motor drive unit 6.

The strongest attractive force is present between the permanent magnets 10 and the stator teeth 12 between the coils 8. The ferrous stator teeth 12 have the function of increasing the magnetic field density. Theoretically, the linear motor drive unit 6 could also be built without iron, but the achievable drive force would then be not as high.

As is clear from FIGS. 1-4, the linear motor drive 6 of the present example lies within the oval shape defined by the guide rail 2 and also comprises an oval shape itself.

Each slide 4 can therefore execute both movement in a straight line and movement around a curve. By means of a combination of straight lines and curves, not only the oval path of the guide rail 2 shown in FIG. 1 but paths of any desired shape can be realized. Many different embodiments are possible here.

Nevertheless, the path shape shown is advantageous to the extent that, in the curves, the slide performs a modified clothoid movement. The curved path has a continuous curvature, and the first and second derivatives of the curvature are also continuous. In this way, the abrupt changes in angular velocity and centrifugal force which would otherwise occur at the entrance to, and the exit from, the curve are avoided. This has the effect of increasing the service life of the rollers, and the vibrations of the overall system are reduced.

Because of the substantially symmetrical structure of the slide 4 and the guide rail 2 with respect to a longitudinal center plane M (FIG. 4) of the conveying device, the force of each coil 8 acting directly on the permanent magnets 10 is neutralized, as already explained above. If, however, the gap between the coil 8 and the permanent magnets 10 were to decrease on one side, a direct force component would arise between the coil 8 and the permanent magnets 10. Because of manufacturing tolerances and dynamic deformations, it must be assumed that the width of the gap will vary and that transverse forces will therefore act on the slide 4. For this reason, the slide 4 must be very sturdily supported, so that the gap between the coil 8 and the permanent magnets 10 can be kept constant to the extent possible on both sides.

This sturdy support is described in greater detail below with reference to FIGS. 3-6. The slide 4 comprises a substantially horseshoe-shaped or U-shaped (or inverted U-shaped) base carrier 14 with two subsections 15. It is also conceivable that the base carrier 14 could comprise more than two subsections 15. Each of the two subsections 15 comprises one of the legs 16, 17 of the U-shape. Rollers 18, 20, 22, 24, 26, 28 project inward from the legs 16, 17.

More concretely, the two subsections 15 in the embodiment shown comprise a first section 27, a second section 29, and a third section 31, which connects the first and second sections 27, 29. The first sections 27 are perpendicular to the longitudinal center plane M. The second sections 29 are parallel to the longitudinal center plan M and comprise the permanent magnets 10 in the lower area, namely, on the inside surfaces of the second sections 29 facing the guide rail 2. The permanent magnets 10 enclose the linear motor drive 6 and thus are plane-parallel to it on both sides. Several permanent magnets 10 are preferably provided on each of the two sides of the slide 4. The connecting third sections 31 are arranged between the first and second sections 27, 29 and at an angle to them.

The six rollers 18, 20, 22, 24, 26, 28 rest on a total of four contact surfaces 30, 32, 34, 36 of the guide rail 2 and roll along on them as the slide 4 moves. The subsection 15 on the left with respect to the longitudinal center plane M as shown in FIG. 4 therefore comprises three rollers 18, 20, 22, wherein the first two rollers 18, 20 rest on the first contact surface 30, and the third roller 22 rests on the second contact surface 32. In a similar manner, the subsection 15 on the right with respect to the longitudinal center plane M comprises three rollers 24, 26, 28, the first two rollers 24, 26 resting on a first contact surface 34, the third roller 28 resting on a second contact surface 36.

Each contact surface 30, 32, 34, 36 on each side is arranged at an acute angle α, α' to the longitudinal center plane M, so that the two contact surfaces 30, 32 and 34, 36 on each side enclose an angle of 80-100° between them. The acute angle α, α' between each contact surface 30, 32, 34, 36 and the longitudinal center plane M is preferably 40-50°, more preferably substantially 45°. Accordingly, it is also advantageous for the two contact surfaces 30, 32 and 34, 36 on each side to form an angle of substantially 90° with each other.

The three rollers 18, 20, 22 and 24, 26, 28 of each subsection 15 are therefore arranged at an angle. More precisely, they form a tilted triangular arrangement, wherein the two first rollers 18, 20; 24, 26 have parallel rotational axes, whereas the third roller 22, 28 has a rotational axis which is tilted with respect to the rotational axes of the first two rollers 18, 20; 24, 26 by an angle of 80-100°, more preferably of substantially 90°. As is especially clear from FIG. 5, the third roller 22, 28 of each subsection 15 is arranged precisely in the middle between the two other rollers 18, 20; 24, 26 with respect to the direction (arrow L) in which the guide rail 2 extends, so that an isosceles and possibly even an equilateral triangle arrangement is obtained.

As can be seen most easily in FIG. 4, the two contact surfaces 30, 32; 34, 36 on each side of the guide rail 2 are a certain distance apart and face each other. The guide rail 2 thus has a cross section in the form of a double T with slanted contact surfaces 30, 32, 34, 36 on the outside walls of the crossbeams of the T.

Figure 6:
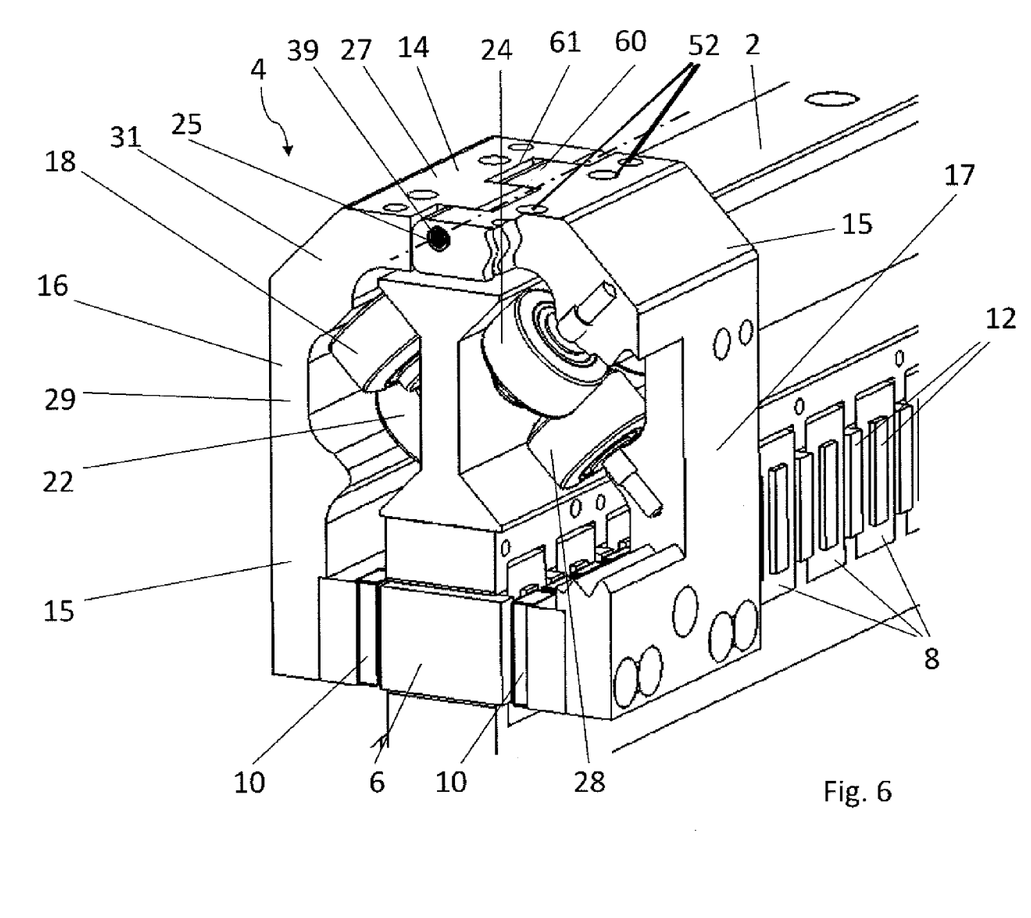
FIG. 6 shows a perspective view of the slide of FIG. 4 with a partially cut-away base carrier.

Finally, as can best be seen in FIGS. 3 and 6, the rollers 18, 20, 22, 24, 26, 28 of the subsections 15 are supported rotatably on the base carrier 14 of the slide 4.

When looking at FIGS. 2-8 it is possible to see that the two subsections 15 are connected so that they can pivot relative to each other around a pivot axis 23 parallel to the longitudinal direction L in which the guide rail 2 extends. As a result, the gap width W (see FIG. 8) between the legs 16, 17 can be adjusted. This mechanism is used to pivot the subsections 15 between a closed or inwardly pivoted working position, in which the base carrier 14 encloses the guide rail 2 (see FIGS. 2-6), and an open or outwardly pivoted maintenance position, in which the base carrier 14 can be removed from the guide rail 2 (see FIGS. 7 and 8). FIG. 8 shows not only the base carrier 14 but also the guide rail 2 on which the slide 4 is guided. In the maintenance position shown in FIG. 8, the subsections 15 are pivoted away from each other, so that the rollers 18, 20, 22, 24, 26, 28 are no longer resting on the guide rail 2. The base carrier 14 can therefore be easily lifted away from the guide rail 2.

The pivot axis 23 is preferably arranged in the longitudinal center plane M of each slide 4. In concrete terms, a positive articulated connection is preferably provided for this purpose. In the embodiments shown in the figures, the positive articulated connection is realized by a dowel pin 25, which engages in the through-holes 39 (see FIG. 6) passing through the subsections 15.

In the embodiment shown, each of the two subsections 15 comprises alternating recesses 60 and projections 61 in the area of the pivot axis 23, wherein the recesses 60 and projections 61 are arranged in such a way that the projections 61 of the one subsection 15 engage in the recesses 60 of the other subsection 15, and the through-holes 39 in the projections 61 are aligned with the recesses 60. The person skilled in the art will easily see many other possible ways of realizing such a pivoting connection. The gap width W depends on the geometry of the articulated connection and on the individual components.

In the normal case, the attractive force between the permanent magnets 10 and the stator teeth 12 is sufficient during operation of the conveying device to oppose an undesirable increase in the gap width W between the legs 16, 17 and thus to maintain sufficient rigidity of the base carrier 14, which in turn ensures that the rollers 18, 20, 22, 24, 26, 28 are pretensioned against the guide rail 2.

If, however, heavier loads are being transported by the conveying device, it may be necessary for the base carrier 14 of the slide 4 to be even more rigid. In this case, as illustrated in FIGS. 9-11, each slide 4 can comprise a removable add-on element 42, which is connected positively or frictionally to the two subsections 15 of the base carrier 14 and which also opposes the undesirable increase in the gap width W between the legs 16, 17.

Figure 10:
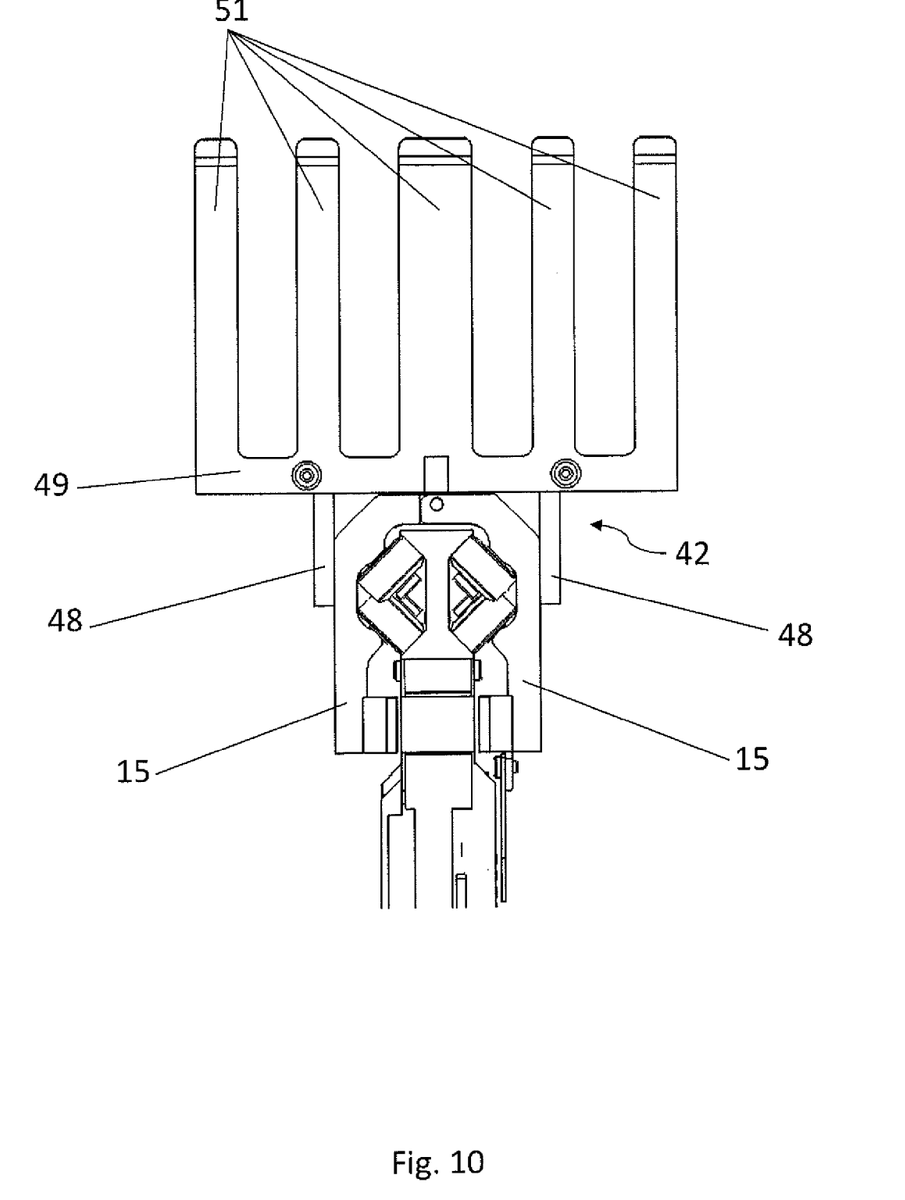
FIG. 10 shows a front view of the slide of FIG. 8 in the closed position with another embodiment of an add-on element.
Figure 11:
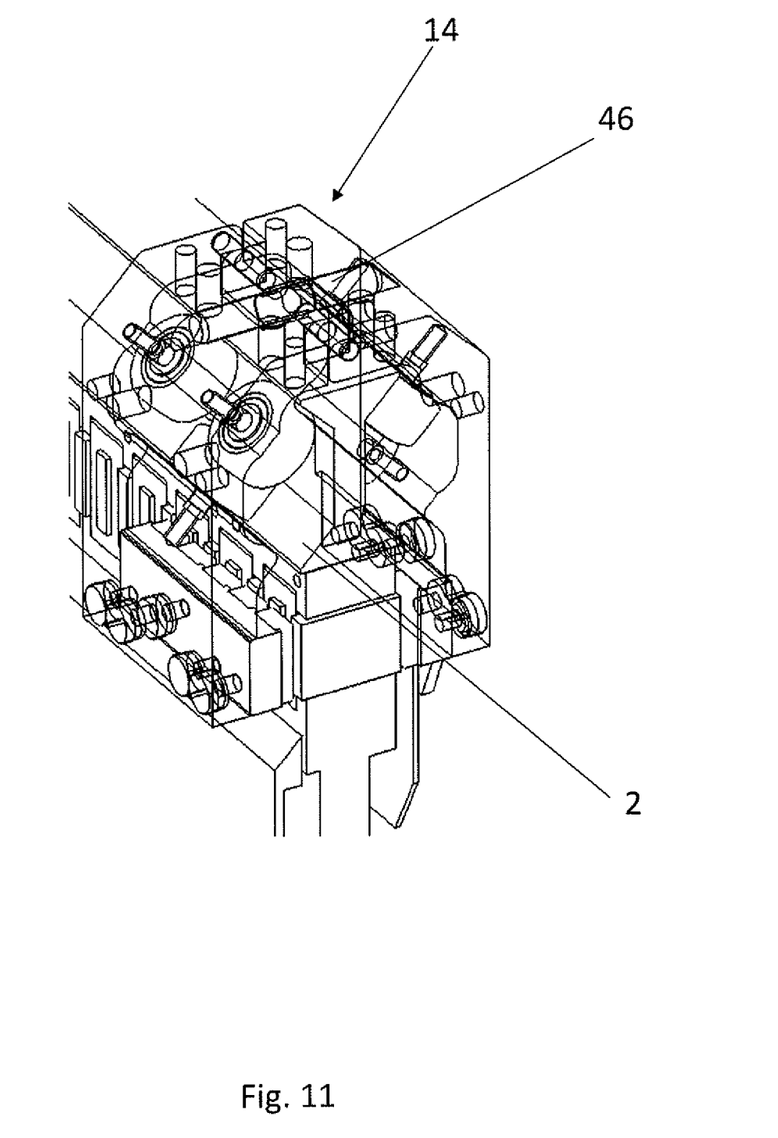
FIG. 11 shows a perspective schematic diagram of a slide with another embodiment of an add-on element.

In the variants of the add-on element 42 shown in FIGS. 9 and 10, the add-on element 42 comprises two arms 48, which positively hold the two subsections 15 of the base carrier 14 between them.

In FIG. 9, the add-on element 42 comprises substantially the shape of U. It is inverted and set down onto the base carrier 14 from above.

In FIG. 10, the two arms 48 of the add-on element 42 are attached to the bottom of a carrier 49, which is used to hold the products and which would be present in any case. The carrier 49 can comprise vertically projecting fingers or tines 51, for example.

Alternatively, the add-on element 42 according to FIG. 11 can be a dowel pin 46, which extends substantially transversely to the longitudinal direction L of the guide rail 2 and passes through a hole extending through the two subsections 15 of the base carrier 14. In concrete terms, the dowel pin 46 in the exemplary embodiment shown here extends from the connecting section 31 of the one subsection 15 in a direction perpendicular to the longitudinal center plane M to the other connecting section 31 of the second subsection 15. The dowel pin 46 prevents the two subsections 15 from pivoting. If the subsections 15 are to be pivoted relative to each other, the dowel pin 46 must be removed first.

Because the various add-on elements 42 shown in FIGS. 9-11 make it possible to set the pretension of the rollers, the advantage is obtained that the slide 4 can be used for any application. By means of the add-on element 42, the rigidity or roller pretension of the slide 4 can be quickly and easily adapted to different formats and products to be conveyed by the slide 4.

So that a slide can be removed from the guide rail 2 even when the conveying device is turned on, it is necessary to overcome the not inconsiderable attractive force between the permanent magnets 10 and the coils 8 and stator teeth 12 of the linear motor drive unit 6. Although this can be done by hand, it takes effort, because in addition there is not much room available between the permanent magnets 10 and the coils 8 or stator teeth 12 to reach in and grip with the fingers.

Figure 12:
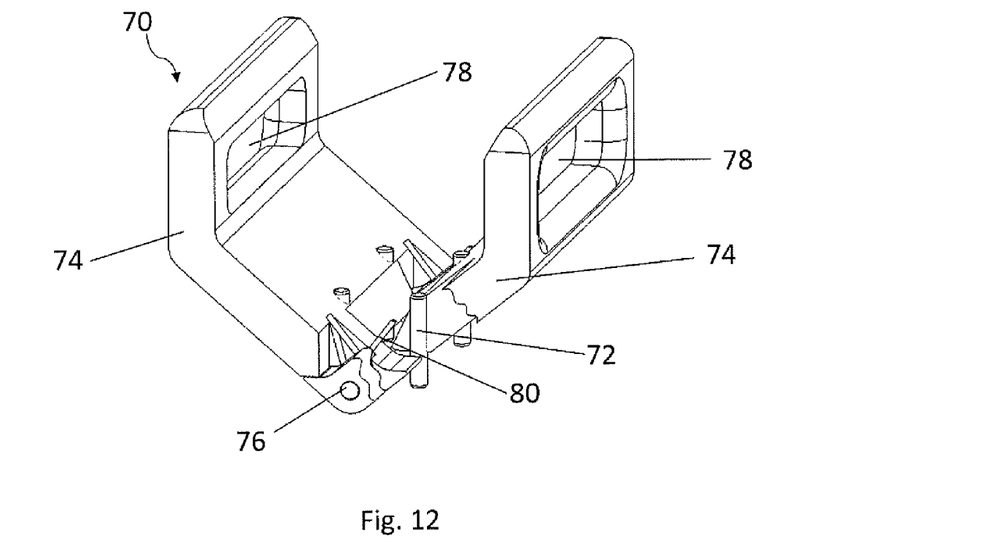
FIG. 12 shows a perspective view of an opening tool for swinging open the closed subsections of the slide.

To facilitate this process, therefore, an opening tool 70 is provided, which is shown in FIG. 12. The opening tool 70 is configured as a pliers with two arms 74, which are connected to each other by a rotary joint 76. Each arm 74 has at least one downward-projecting pin 72, preferably two parallel pins. Each of the two arms 74 has a gripping hollow 78, which is easily accessible to the operator. The gripping hollows 78 of the two arms 74 can now be moved toward each other, i.e., squeezed together, as a result of which the pins 72 of the two arms 74 are moved away from each other in an outward and upward direction. A torsion spring 80 returns the opening tool 70 to its starting position.

Figure 13:
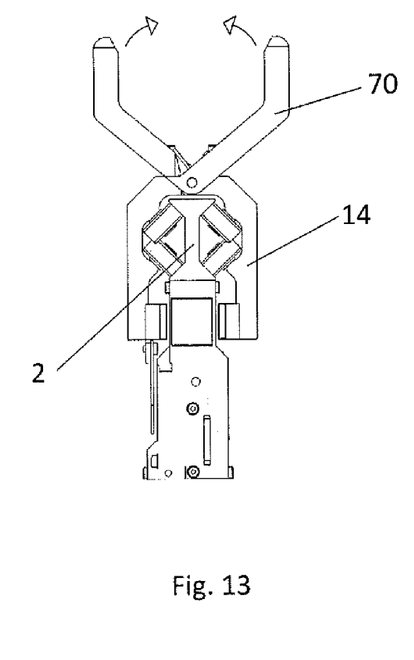
FIG. 13 shows a front view of the opening tool of FIG. 12 set into position on the slide.

To remove a base carrier 14 from the guide rail 2, the opening tool 70 must be set down from above onto the base carrier 14, as shown in FIG. 13. The pins 72 will slide positively into the holes 52 (see FIG. 6) in the base carrier 14, which are arranged near the pivot axis 23. The axis of the rotary joint 76 of the opening tool 70 must be the same as the pivot axis 23 of the slide 4.

Figure 14:
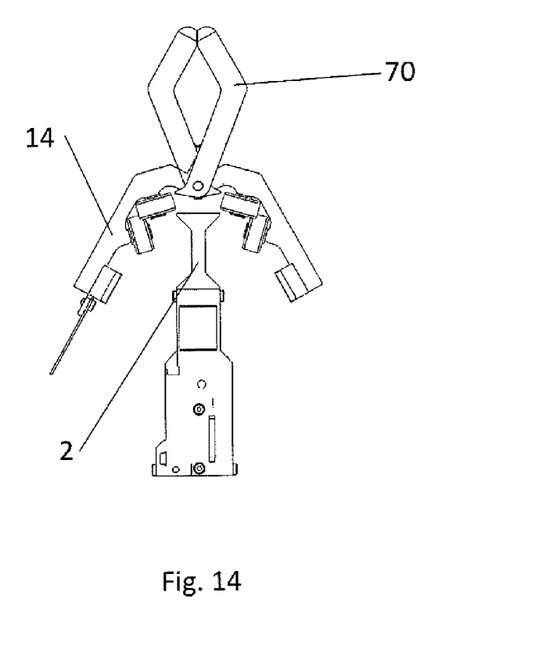
FIG. 14 shows a front view similar to that of FIG. 13, where the opening tool has been squeezed together and the base carrier of the slide has been swung open.

By squeezing the ends of the arms 74 together, force is transmitted by way of the pins 72 and the holes 52 to the base carrier 14, and the two subsections 15 of the base carrier 14 are pivoted into the open maintenance position, shown in FIG. 14. The length of the arms 74 provides a favorable lever ratio, so that the force needed to swing the subsections 15 away from each other is relatively small. The slide 4 can thus be removed from the guide rail 2.

Figure 15:
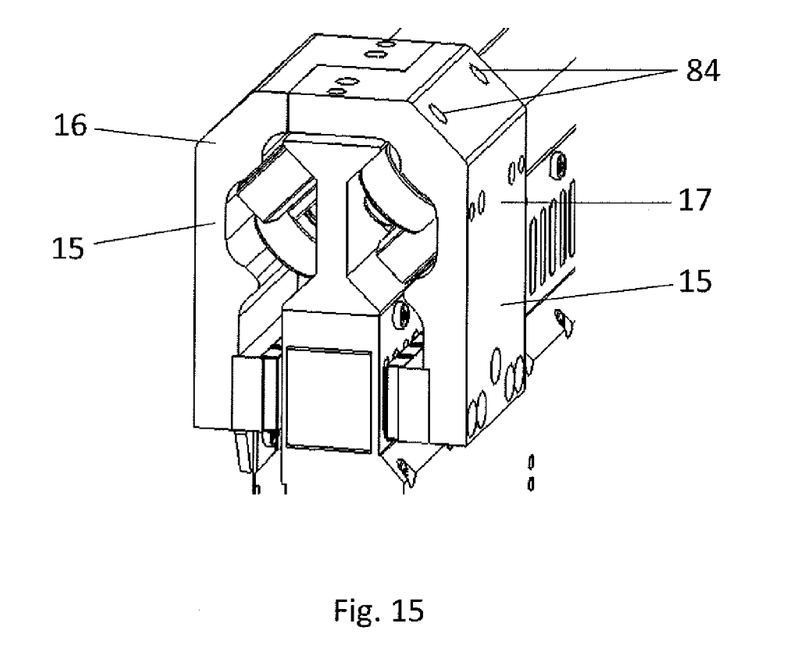
FIG. 15 shows a perspective schematic diagram of another configuration of the slide in the closed state.
Figure 16:
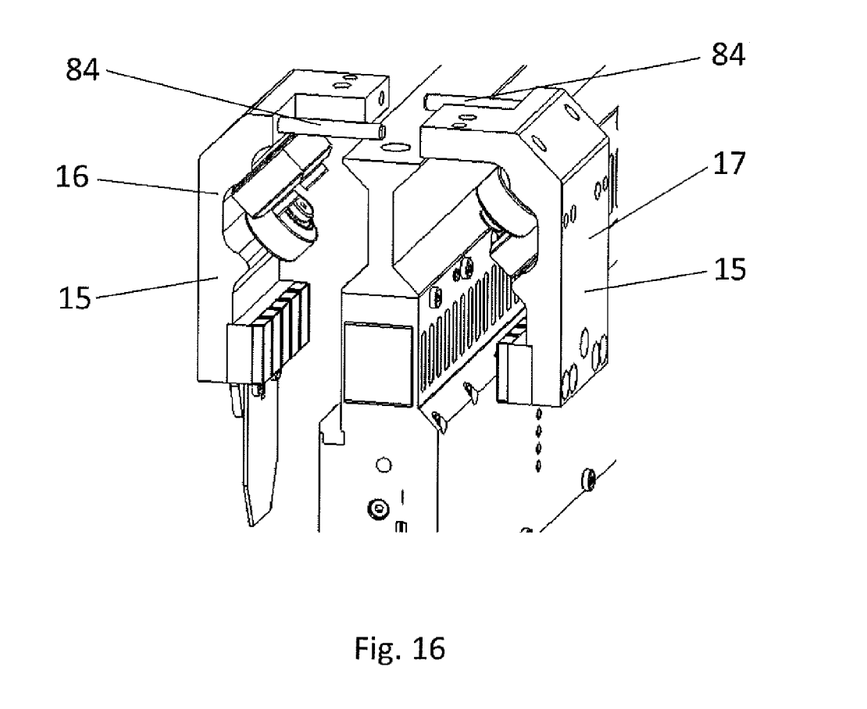
FIG. 16 shows a perspective schematic diagram of the configuration of the slide of FIG. 15 in the opened state.

FIGS. 15 and 16 show an alternative configuration of the slide 4. Here the two subsections 15 can move in a straight line toward each other in the direction transverse to the guide rail 2. In this embodiment, therefore, the variable gap width W between the legs 16, 17 is a linear distance and not, as described previously, an angle.

In the example according to FIGS. 15 and 16, the connection between the two subsections 15 is produced by means of pins 84, each of which fits into an opening in the other subsection 15. Other ways of connecting the two subsections 15 together which allow them to move in linear fashion with respect to each other can also be imagined. Aside from the fact that the pivoting movement of the subsections 15 is replaced by a translational movement, everything else said above about the configuration of the slide 4 with pivotable subsections 15 remains applicable here.

The invention claimed is:

1. A conveying device for conveying products, comprising:
   at least one individually movable slide for holding at least one product;
   a guide rail, on which the at least one slide is guided;
   a linear motor drive unit for driving the at least one slide;
   wherein the at least one slide comprises a substantially horseshoe-shaped or U-shaped base carrier having two legs, which enclose the guide rail on two opposite sides, wherein rollers project inward from the legs;
   wherein the at least one slide comprises at least two permanent magnets, which are arranged at the sides of the linear motor drive unit, and which interact with coils of the linear motor drive unit;
   wherein an attractive force between the permanent magnets and the linear motor drive unit pretensions the rollers of the at least one slide against the guide rail;
   wherein the base carrier is divided into at least two interconnected subsections, each of which comprises a leg; and
   wherein the at least two subsections are movable relative to each other, wherein the subsections are movable between a closed working position, in which the base carrier encloses the guide rail, and an open maintenance position, in which the base carrier can be removed from the guide rail.

2. The conveying device according to claim 1, wherein the subsections are movable relative to each other transversely to a longitudinal direction of the guide rail.

3. The conveying device according to claim 1, wherein the two legs have a substantially mirror-symmetric shape with respect to a longitudinal center plane of the at least one slide.

4. The conveying device according to claim 1, wherein the subsections are pivotably connected to each other around a pivot axis extending parallel to a longitudinal direction of the guide rail.

5. The conveying device according to claim 4, wherein the pivot axis is arranged in a longitudinal center plane of the at least one slide.

6. The conveying device according to claim 4, wherein the pivot axis is configured as a positive articulated connection.

7. The conveying device according to claim 6, wherein the positive articulated connection is realized by a dowel pin, which engages in through-holes passing through the subsections.

8. The conveying device according to claim 7, wherein each of the subsections comprises recesses and projections in an area of the pivot axis, wherein the recesses and the projections are arranged in such a way that the projections of one subsection engage in the recesses in the other subsection, and the through-holes in the projections are aligned with the recesses.

9. The conveying device according to claim 1, wherein the at least one slide comprises a removable add-on element, which is connected positively or frictionally to the subsections of the base carrier and opposes an undesirable increase in a gap width between the legs.

10. The conveying device according to claim 9, wherein the add-on element comprises two arms, which holds the subsections of the base carrier positively between them.

11. The conveying device according to claim 10, wherein the add-on element comprises a substantially inverted U shape.

12. The conveying device according to claim 9, wherein the add-on element is a dowel pin, which extends substantially transversely to a longitudinal direction of the guide rail through the subsections of the base carrier.

13. The conveying device according to claim 1, wherein the subsections comprise recesses to receive pins of an opening tool.

* * * * *

UNITED STATES PATENT AND TRADEMARK OFFICE
CERTIFICATE OF CORRECTION

| | | |
|---|---|---|
| PATENT NO. | : 9,446,902 B2 | Page 1 of 1 |
| APPLICATION NO. | : 14/947901 | |
| DATED | : September 20, 2016 | |
| INVENTOR(S) | : Aumann et al. | |

It is certified that error appears in the above-identified patent and that said Letters Patent is hereby corrected as shown below:

On the Title Page

Item (72) Inventor is corrected to read:
-- Thomas Aumann, Mietingen, DE;
Juergen Haaga, Rottenacker, DE;
Wolfgang Rodi, Laupheim/Baustetten, DE;
Daniel Zieher, Ummendorf, DE --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*